(12) United States Patent
Jin et al.

(10) Patent No.: US 11,442,313 B2
(45) Date of Patent: Sep. 13, 2022

(54) ILLUMINATION DEVICE COMPRISING A FIRST PHASE DIFFERENCE LAYER DISPOSED ADJACENT TO A SECOND PHASE DIFFERENCE LAYER IN A SAME LAYER ON A MAIN SURFACE OF A LIQUID CRYSTAL ELEMENT

(71) Applicant: Japan Display Inc., Tokyo (JP)

(72) Inventors: Lu Jin, Tokyo (JP); Yosuke Hyodo, Tokyo (JP); Shinichiro Oka, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 17/545,512

(22) Filed: Dec. 8, 2021

(65) Prior Publication Data
US 2022/0187646 A1    Jun. 16, 2022

(30) Foreign Application Priority Data
Dec. 11, 2020  (JP) .............................. JP2020-205971

(51) Int. Cl.
*G02F 1/13357*    (2006.01)
*G02F 1/1335*    (2006.01)
*G02F 1/13363*    (2006.01)

(52) U.S. Cl.
CPC ...... *G02F 1/13363* (2013.01); *G02F 1/13362* (2013.01); *G02F 1/133504* (2013.01); *G02F 1/133541* (2021.01)

(58) Field of Classification Search
CPC ......... G02F 1/133541; G02F 1/133635; G02F 2413/13; G02F 2413/00; G02F 2413/01; G02F 2413/02; G02F 2413/04; G02F 2413/05; G02F 2413/06; G02F 2413/08; G02F 2413/12; G02F 2413/14; G02F 1/1326
See application file for complete search history.

(56) References Cited

U.S. PATENT DOCUMENTS

| 2007/0013624 | A1* | 1/2007 | Bourhill | ............... | H04N 13/354 345/84 |
| 2011/0216277 | A1* | 9/2011 | Chen | ..................... | G02F 1/1335 349/117 |
| 2013/0201427 | A1* | 8/2013 | Chen | ..................... | G02B 30/25 349/61 |

(Continued)

FOREIGN PATENT DOCUMENTS

JP    2020-38279 A    3/2020

*Primary Examiner* — Paul C Lee
(74) *Attorney, Agent, or Firm* — Maier & Maier, PLLC (57) ABSTRACT

According to one embodiment, an illumination device includes a first liquid crystal element opposed to a light emitting region, a second liquid crystal element including a first main surface and a second main surface, a first phase difference layer disposed on the second main surface, a second phase difference layer disposed on the second main surface and adjacent to the first phase difference layer, and a diffusion layer opposed to the first phase difference layer and the second phase difference layer. Each of the first liquid crystal element and the second liquid crystal element has a plurality of liquid crystal molecules, and is cured in a state in which an alignment direction of the liquid crystal molecules has continuously changed in plane.

15 Claims, 9 Drawing Sheets

(56) References Cited

U.S. PATENT DOCUMENTS

| | | | |
|---|---|---|---|
| 2014/0308462 A1* | 10/2014 | Nara | C09K 19/28 428/1.2 |
| 2015/0277134 A1* | 10/2015 | Kim | G02B 5/201 359/465 |
| 2017/0146849 A1* | 5/2017 | Tang | G02F 1/13363 |
| 2018/0172889 A1* | 6/2018 | Yanai | E06B 9/24 |
| 2021/0181579 A1 | 6/2021 | Mifune | |

* cited by examiner

ILLUMINATION DEVICE COMPRISING A FIRST PHASE DIFFERENCE LAYER DISPOSED ADJACENT TO A SECOND PHASE DIFFERENCE LAYER IN A SAME LAYER ON A MAIN SURFACE OF A LIQUID CRYSTAL ELEMENT

CROSS-REFERENCE TO RELATED APPLICATION

This application is based upon and claims the benefit of priority from Japanese Patent Application No. 2020-205971, filed Dec. 11, 2020, the entire contents of which are incorporated herein by reference.

FIELD

Embodiments described herein relate generally to an illumination device.

BACKGROUND

As an example of display devices, a head-up display that projects an image on a front shield of a vehicle is known. When the display device is a liquid crystal display device, an illumination device for illuminating the liquid crystal panel is required. Illumination light emitted from the illumination device is required to have uniform luminance.

DETAILED DESCRIPTION

In general, according to one embodiment, there is provided an illumination device including a light source having a light emitting region, a first liquid crystal element opposed to the light emitting region, a second liquid crystal element comprising a first main surface opposed to the first liquid crystal element and a second main surface opposite to the first main surface, a first phase difference layer disposed on the second main surface and having a first optical axis in plane, a second phase difference layer disposed on the second main surface, adjacent to the first phase difference layer, and having a second optical axis orthogonal to the first optical axis in plane, and a diffusion layer opposed to the first phase difference layer and the second phase difference layer, wherein each of the first liquid crystal element and the second liquid crystal element has a plurality of liquid crystal molecules, and is cured in a state in which an alignment direction of the liquid crystal molecules has continuously changed in plane.

According to another embodiment, there is provided an illumination device including a light source, a first liquid crystal element opposed to the light source, a second liquid crystal element opposed to the first liquid crystal element and having a first region and a second region, a first phase difference layer opposed to the second liquid crystal element, and a second phase difference layer opposed to the second liquid crystal element and adjacent to the first phase difference layer, wherein the first liquid crystal element diffracts first circularly polarized light out of emitted light from the light source toward the first region, and diffracts second circularly polarized light rotating reversely to the first circularly polarized light toward the second region, in the first region, the second liquid crystal element converts first circularly polarized light into second circularly polarized light and diffracts the second circularly polarized light toward the first phase difference layer, and in the second region, the second liquid crystal element converts second circularly polarized light into first circularly polarized light and diffracts the first circularly polarized light toward the second phase difference layer, the first phase difference layer converts second circularly polarized light into linearly polarized light, the second phase difference layer converts first circularly polarized light into linearly polarized light, and a polarization direction of linearly polarized light that is transmitted light through the first phase difference layer is substantially parallel to a polarization direction of linearly polarized light that is transmitted light through the second phase difference layer.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

Note that, in order to make the descriptions more easily understandable, some of the drawings illustrate an X axis, a Y axis and a Z axis orthogonal to each other. A direction along the X axis is referred to as an X direction or a first direction, a direction along the Y axis is referred to as a Y direction or a second direction and direction along the Z axis is referred to as a Z direction or a third direction. A plane defined by the X axis and the Y axis is referred to as an X-Y plane, and a plane defined by the X axis and the Z axis is referred to as an X-Z plane. Further, viewing towards the X-Y plane is referred to as planar view.

Figure 1:
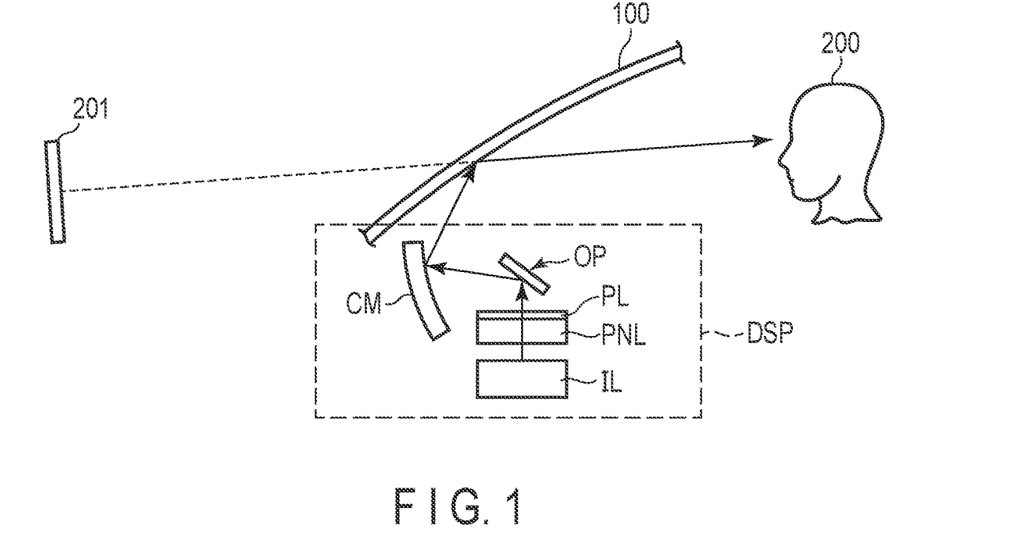
FIG. 1 is a diagram illustrating an example of a display device DSP according to the present embodiment.

FIG. 1 is a diagram illustrating an example of a display device DSP according to the present embodiment. The display device DSP of the example illustrated in FIG. 1 is a head-up display using a front shield of a vehicle or the like as a projection surface (screen) 100. Incidentally, the projection surface 100 is not limited to the front shield itself, and may be another combiner.

The display device DSP includes an illumination device IL, a liquid crystal panel PNL, a polarizer PL, an optical system OP, and a concave mirror CM. The liquid crystal panel PNL is disposed between the illumination device IL and the polarizer PL. The polarizer PL is bonded to the liquid crystal panel PNL. The optical system OP includes at least one plane mirror disposed between the polarizer PL and the concave mirror CM. The concave mirror CM is disposed between the optical system OP and the projection surface 100.

As will be described later, the illumination device IL is configured to emit linearly polarized light having a uniform polarization direction as illumination light. In other words, the liquid crystal panel PNL is illuminated by the illumination light that is linearly polarized light. This allows the polarizer between the illumination device IL and the liquid crystal panel PNL to be omitted.

The liquid crystal panel PNL is configured to selectively transmit illumination light from the illumination device IL to display an image. The optical system OP guides the display light transmitted through the polarizer PL to the concave mirror CM. The concave mirror CM projects the display light onto the projection surface 100. A user 200 who uses the display device DSP can visually recognize a virtual image 201 in front of the projection surface 100.

First Embodiment

Figure 2:
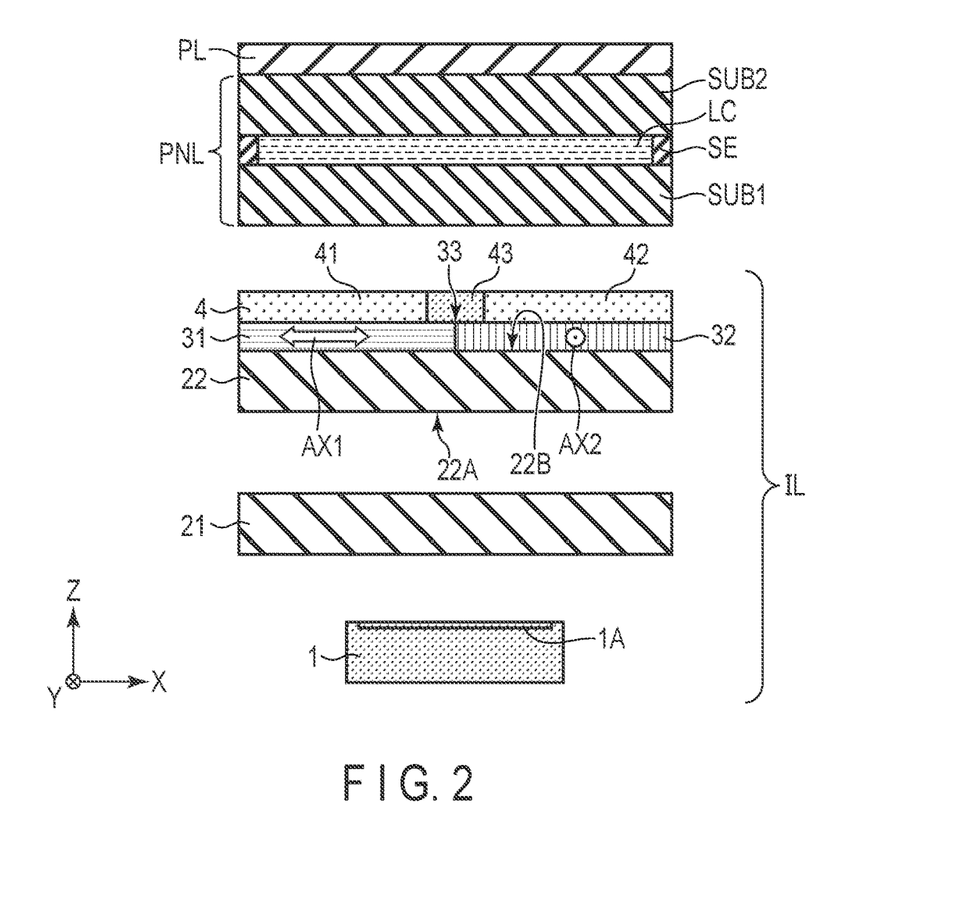
FIG. 2 is a diagram illustrating a first embodiment of an illumination device IL illustrated in FIG. 1.

FIG. 2 is a diagram illustrating a first embodiment of the illumination device IL illustrated in FIG. 1. The illumination device IL includes a light source 1, a first liquid crystal element 21, a second liquid crystal element 22, a first phase difference layer 31, a second phase difference layer 32, and a diffusion layer 4.

The light source 1 has a light emitting region 1A that emits illumination light. The first liquid crystal element 21 is opposed to the light emitting region 1A at an interval in a third direction Z. The second liquid crystal element 22 is opposed to the first liquid crystal element 21 at an interval in the third direction Z. The second liquid crystal element 22 has a first main surface 22A opposed to the first liquid crystal element 21 and a second main surface 22B opposite to the first main surface 22A.

The first phase difference layer 31 and the second phase difference layer 32 are disposed on the second main surface 22B. The first phase difference layer 31 is adjacent to the second phase difference layer 32 in the first direction X. In the example illustrated in FIG. 2, the first phase difference layer 31 is disposed so as to cover a left half of the second main surface 22B, and the second phase difference layer 32 is disposed so as to cover a right half of the second main surface 22B. For example, the first phase difference layer 31 and the second phase difference layer 32 are bonded to the second main surface 22B.

In addition, the first phase difference layer 31 has a first optical axis AX1 in plane, and the second phase difference layer 32 has a second optical axis AX2 in plane. In plane herein corresponds to in plane parallel to the X-Y plane defined by the first direction X and the second direction Y. The first optical axis AX1 and the second optical axis AX2 are orthogonal to each other. For example, the first optical axis AX1 is parallel to the first direction X, and the second optical axis AX2 is parallel to the second direction Y.

The first phase difference layer 31 and the second phase difference layer 32 have the same function as a quarter-wave plate, and impart a phase difference of a quarter wavelength to transmitted light. Incidentally, for example, the first phase difference layer 31 and the second phase difference layer 32 impart a phase difference of a quarter wavelength to at least light of a green wavelength, but not limited thereto. As the first phase difference layer 31 and the second phase difference layer 32, for example, a wide-band type retardation film that also imparts a phase difference of an approximately quarter wavelength to each light of a red wavelength, a green wavelength, and a blue wavelength can be applied. The first optical axis AX1 and the second optical axis AX2 are, for example, slow axes, but may be fast axes.

The diffusion layer 4 is opposed to the first phase difference layer 31 and the second phase difference layer 32 in the third direction Z. In the example illustrated in FIG. 2, the diffusion layer 4 is bonded to the first phase difference layer 31 and the second phase difference layer 32. Incidentally, the diffusion layer 4 may be spaced apart from the first phase difference layer 31 and the second phase difference layer 32.

In the first embodiment, the diffusion layer 4 includes a first diffusion region 41, a second diffusion region 42, and a third diffusion region 43. The first diffusion region 41 is opposed to the first phase difference layer 31 in the third direction Z. The second diffusion region 42 is opposed to the second phase difference layer 32 in the third direction Z. The third diffusion region 43 is located between the first diffusion region 41 and the second diffusion region 42 in the first direction X. In addition, the third diffusion region 43 is opposed to a region including a boundary 33 between the first phase difference layer 31 and the second phase difference layer 32 in the third direction Z.

The third diffusion region 43 has a haze higher than those of the first diffusion region 41 and the second diffusion region 42. Incidentally, the haze of the first diffusion region 41 is equal to the haze of the second diffusion region 42. When the diffusion layer 4 is visually observed, the third diffusion region 43 has lower transparency than the first diffusion region 41 and the second diffusion region 42.

Incidentally, the first diffusion region 41 and the second diffusion region 42 desirably have high transparency from the viewpoint of maintaining the polarization degree of transmitted light or maintaining parallelism of transmitted light. The haze of each of the first diffusion region 41, the second diffusion region 42, and the third diffusion region 43 can be adjusted by the density, the particle diameter, and the like of a diffusion substance (for example, beads) included in each region.

For example, when the first phase difference layer 31 and the second phase difference layer 32 are bonded to the second main surface 22B with an alignment accuracy (or an assumed range of the deviation amount of the boundary 33 position along the first direction X) of ±100 μm, the third diffusion region 43 has a width along the first direction X of, for example, 200 μm or more.

The liquid crystal panel PNL is opposed to the diffusion layer 4 in the third direction Z. In the example illustrated in FIG. 2, the liquid crystal panel PNL is spaced apart from the diffusion layer 4, but may be bonded to the diffusion layer 4. The liquid crystal panel PNL includes a first substrate SUB1, a second substrate SUB2, and a liquid crystal layer LC. The liquid crystal layer LC is held between the first substrate SUB1 and the second substrate SUB2, and is sealed by a sealant SE. The polarizer PL is bonded to the second substrate SUB2. No polarizer is disposed between the diffusion layer 4 and the first substrate SUB1. For this reason, when the liquid crystal panel PNL is bonded to the diffusion layer 4, the first substrate SUB1 is directly bonded to the diffusion layer 4.

Figure 3:
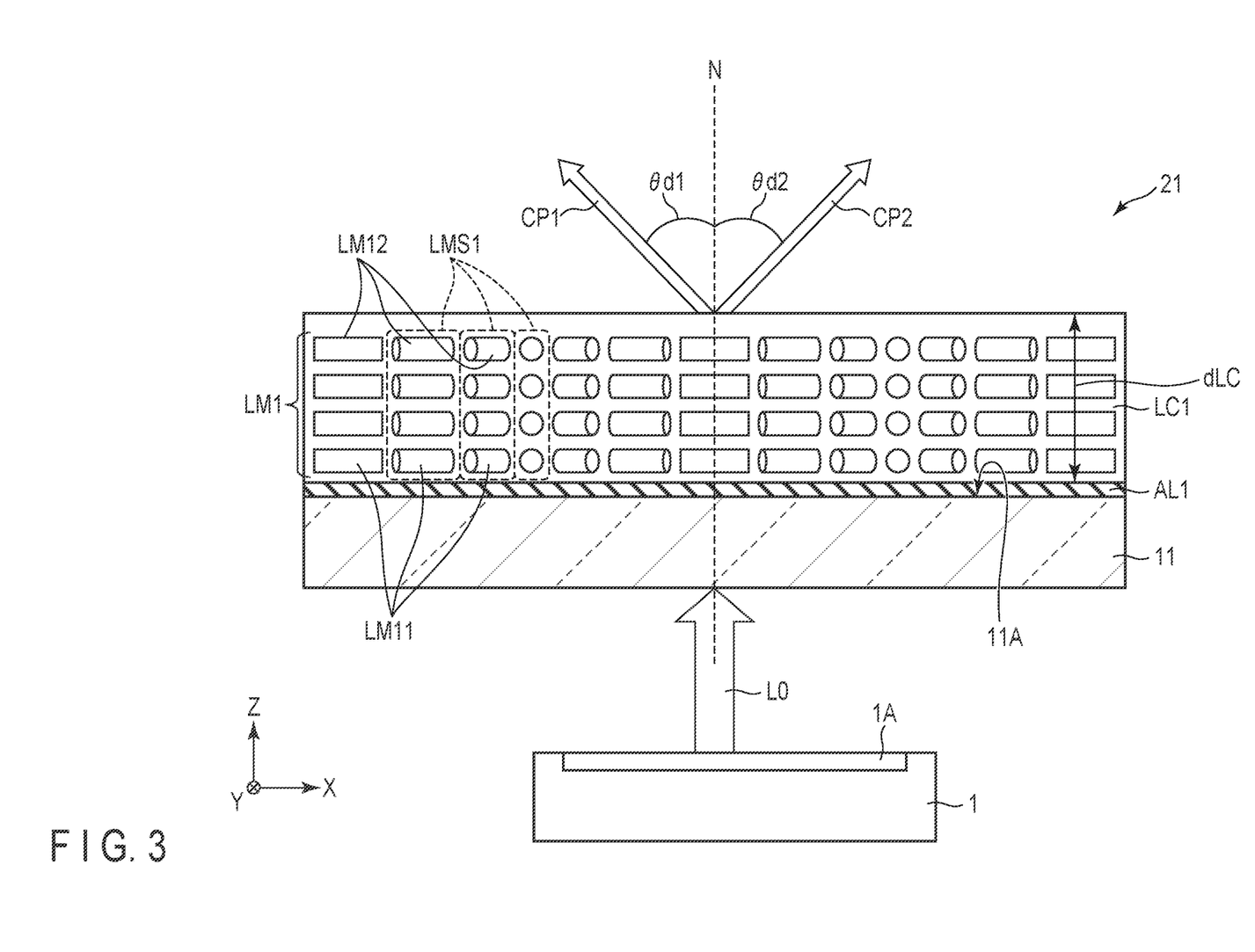
FIG. 3 is a cross-sectional view illustrating an example of a first liquid crystal element 21 in FIG. 2.

FIG. 3 is a cross-sectional view illustrating an example of the first liquid crystal element 21 in FIG. 2. The first liquid crystal element 21 includes a substrate 11, an alignment film AL1, and a liquid crystal layer (first liquid crystal layer) LC1. The substrate 11 is a transparent substrate that transmits light, and is formed of, for example, a transparent glass plate or a transparent synthetic resin plate.

The alignment film AL1 is disposed on an inner surface 11A of the substrate 11. In the example illustrated in FIG. 3, the alignment film AL1 is in contact with the substrate 11, but another thin film may be interposed between the alignment film AL1 and the substrate 11. The alignment film AL1 is, for example, a horizontal alignment film formed of polyimide and having an alignment restriction force along the X-Y plane.

The liquid crystal layer LC1 is disposed on the alignment film AL1 and is in contact with the alignment film AL1. Incidentally, another transparent base may be disposed on the liquid crystal layer LC1. The liquid crystal layer LC1 has a thickness dLC along the third direction Z. The liquid crystal layer LC1 has a nematic liquid crystal having a uniform alignment direction of liquid crystal molecules LM1 arranged along the third direction Z. Incidentally, the liquid crystal layer LC1 may use another liquid crystal.

That is, the liquid crystal layer LC1 includes a plurality of liquid crystal structures LMS1. Focusing on one liquid crystal structure LMS1, the liquid crystal structure LMS1 has a liquid crystal molecule LM11 located on one end side thereof and a liquid crystal molecule LM12 located on the other end side thereof. The alignment direction of the liquid crystal molecules LM11 and the alignment direction of the liquid crystal molecules LM12 are substantially coincident with each other. In addition, the alignment direction of other liquid crystal molecules LM1 between the liquid crystal molecule LM11 and the liquid crystal molecule LM12 is also substantially coincident with the alignment direction of the liquid crystal molecule LM11. Incidentally, the alignment direction of the liquid crystal molecules LM1 herein corresponds to the direction of the major axes of the liquid crystal molecules on the X-Y plane.

In the liquid crystal layer LC1, the plurality of liquid crystal structures LMS1 adjacent to each other along the first direction X are aligned in different directions from each other. The plurality of liquid crystal structures LMS1 adjacent to each other along the second direction Y are uniformly aligned.

Such liquid crystal layer LC1 is cured in a state in which the alignment direction of the liquid crystal molecules LM1 including the liquid crystal molecule LM11 and the liquid crystal molecule LM12 is fixed. In other words, the alignment direction of the liquid crystal molecules LM1 is not controlled according to an electric field. For this reason, the first liquid crystal element 21 does not include an electrode for alignment control.

When the refractive anisotropy or birefringence of the liquid crystal layer LC1 is $\Delta n$ (difference between a refractive index ne of the liquid crystal layer LC1 for extraordinary light and a refractive index no of the liquid crystal layer LC1 for ordinary light), the retardation (phase difference) $\Delta n \cdot dLC$ of the liquid crystal layer LC1 is set to ½ of a specific wavelength $\lambda$. The specific wavelength herein is, for example, a green wavelength (550 nm).

Figure 4:
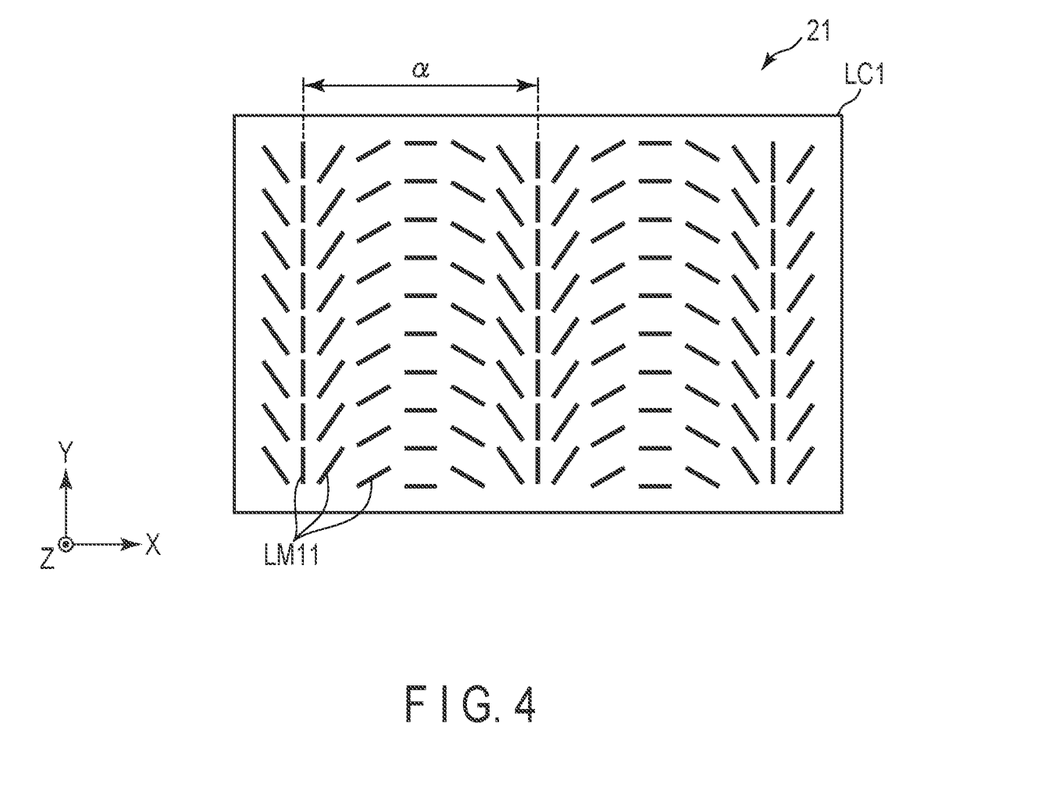
FIG. 4 is a plane view schematically illustrating an example of an alignment pattern in a liquid crystal layer LC1 illustrated in FIG. 3.

FIG. 4 is a plane view schematically illustrating an example of an alignment pattern in the liquid crystal layer LC1 illustrated in FIG. 3. FIG. 4 schematically illustrates the alignment direction of the liquid crystal molecule LM11 among the liquid crystal molecules contained in each liquid crystal structure.

The liquid crystal molecules LM11 arranged along the first direction X are aligned in different directions from each other. In other words, spatial phases in the X-Y plane are different along the first direction X. Moreover, the alignment direction of the plurality of liquid crystal molecules LM11 continuously changes along the first direction X. For example, the alignment direction of each of the liquid crystal molecules LM11 changes by a certain angle along the first direction X (from left to right in the drawing).

In contrast, the alignment directions of the liquid crystal molecules LM11 arranged along the second direction Y are approximately coincident with each other. In other words, the spatial phases in the X-Y plane are approximately coincident with each other in the second direction Y.

Referring back to FIG. 3, an optical action of the first liquid crystal element 21 will be described.

On the first liquid crystal element 21, light may be incident from the liquid crystal layer LC1 side or from the substrate 11 side. Here, the case where light is incident from the substrate 11 side will be described.

The light emitting region 1A is opposed to the substrate 11 in the third direction Z. Illumination light L0 emitted from the light emitting region 1A is white and unpolarized light. The illumination light L0 becomes incident light on the first liquid crystal element 21. Here, the illumination light L0 is assumed to be parallel light along a normal N indicated by a dotted line of the first liquid crystal element 21.

The illumination light L0 is transmitted through the first liquid crystal element 21 and then divided into first circularly polarized light CP1 and second circularly polarized light CP2. The second circularly polarized light CP2 is circularly polarized light rotating reversely to the first circularly polarized light CP1. For example, the first circularly polarized light CP1 is counterclockwise circularly polarized light, and the second circularly polarized light CP2 is clockwise circularly polarized light.

The first circularly polarized light CP1 is diffracted at a diffraction angle $\theta d1$. The second circularly polarized light CP2 is diffracted at a diffraction angle $\theta d2$. However, both the first circularly polarized light CP1 and the second circularly polarized light CP2 are white light and each include light of a red wavelength, light of a green wavelength, and light of a blue wavelength. Strictly speaking, the diffraction angles of the lights of the respective wavelengths are different from each other. For example, the diffraction angle of the red wavelength light included in the first circularly polarized light CP1 is larger than the diffraction angle of the blue wavelength light included therein.

Figure 5:
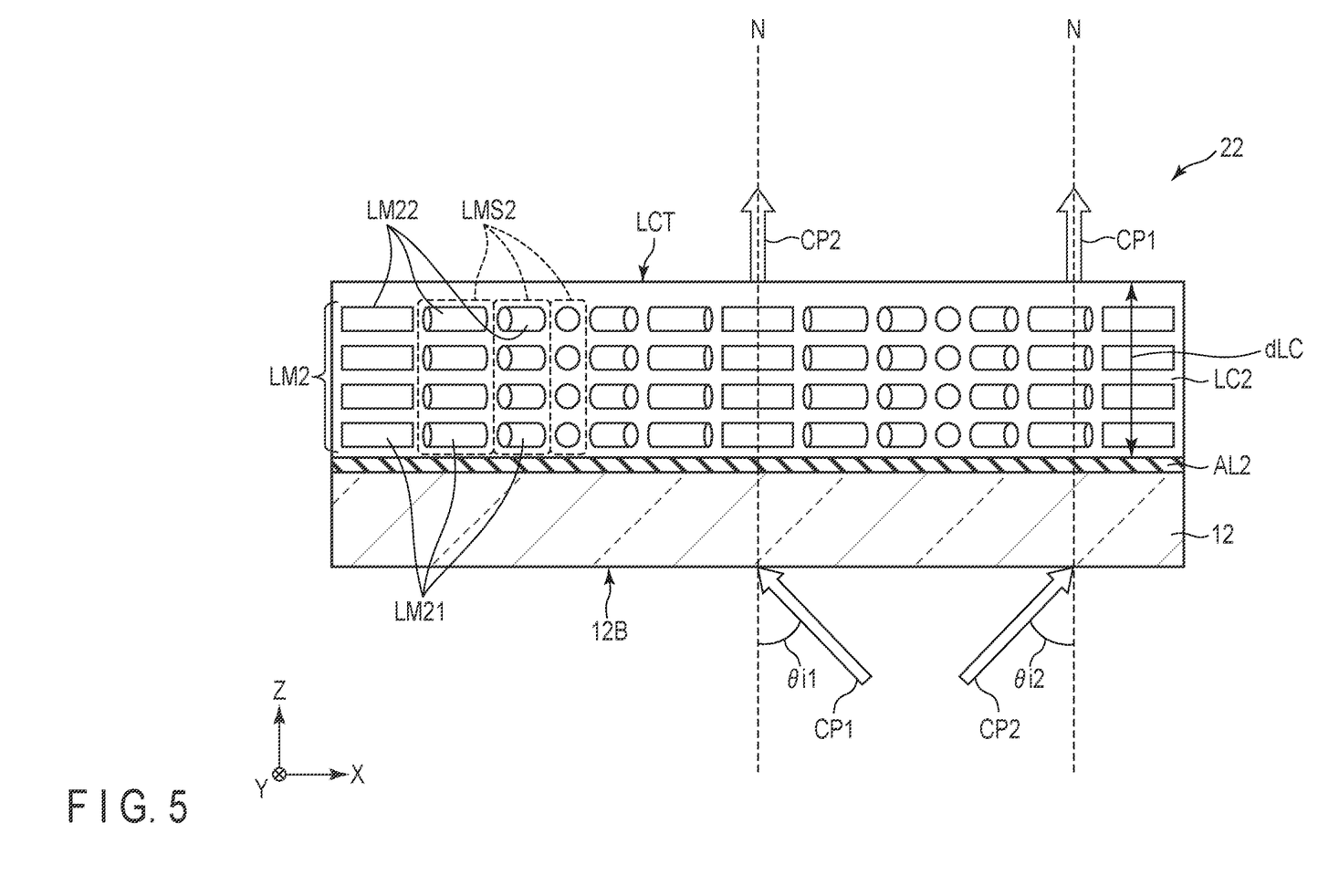
FIG. 5 is a cross-sectional view illustrating an example of a second liquid crystal element 22 in FIG. 2.

FIG. 5 is a cross-sectional view illustrating an example of the second liquid crystal element 22 in FIG. 2. The second liquid crystal element 22 has the same configuration as the first liquid crystal element 21. That is, the second liquid crystal element 22 includes a substrate 12, an alignment film AL2, and a liquid crystal layer (second liquid crystal layer) LC2. The substrate 12 is the same transparent substrate as the substrate 11. The alignment film AL2 is the same horizontal alignment film as the alignment film AL1.

The liquid crystal layer LC2 is the same as the liquid crystal layer LC1, and has a nematic liquid crystal having a uniform alignment direction of liquid crystal molecules LM2 arranged along the third direction Z. The liquid crystal layer LC2 includes a plurality of liquid crystal structures LMS2. The liquid crystal structure LMS2 has a liquid crystal molecule LM21 located on one end side thereof and a liquid crystal molecule LM22 located on the other end side thereof. The alignment direction of the liquid crystal molecules LM21 and the alignment direction of the liquid crystal molecules LM22 are substantially coincident with each other. In addition, the alignment direction of other liquid crystal molecules LM2 between the liquid crystal molecule LM21 and the liquid crystal molecule LM22 is also substantially coincident with the alignment direction of the liquid crystal molecule LM21. Incidentally, similar to the liquid crystal layer LC1, the liquid crystal layer LC2 may use another liquid crystal.

The alignment pattern in the liquid crystal layer LC2 is the same as the alignment pattern in the liquid crystal layer LC1 illustrated in FIG. 4. Among the liquid crystal molecules LM2, for example, the alignment direction of the plurality of liquid crystal molecules LM21 continuously changes along the first direction X. Such liquid crystal layer LC2 is cured in a state in which the alignment direction of the liquid crystal molecules LM2 including the liquid crystal molecule LM21 and the liquid crystal molecule LM22 is fixed.

The refractive anisotropy Δn of the liquid crystal layer LC2 and the thickness dLC of the liquid crystal layer LC2 are the same as those of the liquid crystal layer LC1. For this reason, the retardation Δn·dLC of the liquid crystal layer LC2 is also the same as the retardation of the liquid crystal layer LC1.

On the second liquid crystal element 22, light may be incident from an upper surface LCT of the liquid crystal layer LC2 or from an outer surface 12B of the substrate 12. Here, the case where light is incident from the outer surface 12B of the substrate 12 will be described. The incident light herein refers to the transmitted lights (the first circularly polarized light CP1 and the second circularly polarized light CP2) of the first liquid crystal element 21 illustrated in FIG. 3. These incident lights are diffracted when transmitted through the second liquid crystal element 22.

That is, the first circularly polarized light CP1 as incident light is incident from the substrate 12 at an angle of incidence θi1. The angle of incidence θi1 is equal to the diffraction angle θd1 illustrated in FIG. 3. After being transmitted through the second liquid crystal element 22, the first circularly polarized light CP1 becomes parallel light along the normal N, and is also converted into the second circularly polarized light CP2.

The second circularly polarized light CP2 as incident light is incident from the substrate 12 at an angle of incidence θi2. The angle of incidence θi2 is equal to the diffraction angle θd2 illustrated in FIG. 3. After being transmitted through the second liquid crystal element 22, the second circularly polarized light CP2 becomes parallel light along the normal N, and is also converted into the first circularly polarized light CP1.

As described with reference to FIG. 3, also in the second liquid crystal element 22, the diffraction angles of the lights of the respective wavelengths are different from each other, and for example, the diffraction angle of the red wavelength light included in the first circularly polarized light CP1 is larger than the diffraction angle of the blue wavelength light included therein. Since the second liquid crystal element 22 described here has the same configuration as the first liquid crystal element 21, the wavelength dispersion characteristic of the second liquid crystal element 22 is equivalent to the wavelength dispersion characteristic of the first liquid crystal element 21. In other words, the difference in diffraction angle of the light of each wavelength transmitted through the first liquid crystal element 21 is canceled out when the light of each wavelength is transmitted through the second liquid crystal element 22. For this reason, the light transmitted through the second liquid crystal element 22 becomes the same parallel light as the illumination light L0 before incident on the first liquid crystal element 21.

In the example shown in FIG. 5, the upper surface LCT of the liquid crystal layer LC2 corresponds to the second main surface 22B of the second liquid crystal element 22. In this case, the first phase difference layer 31 and the second phase difference layer 32 illustrated in FIG. 2 are disposed on the upper surface LCT.

Figure 6:
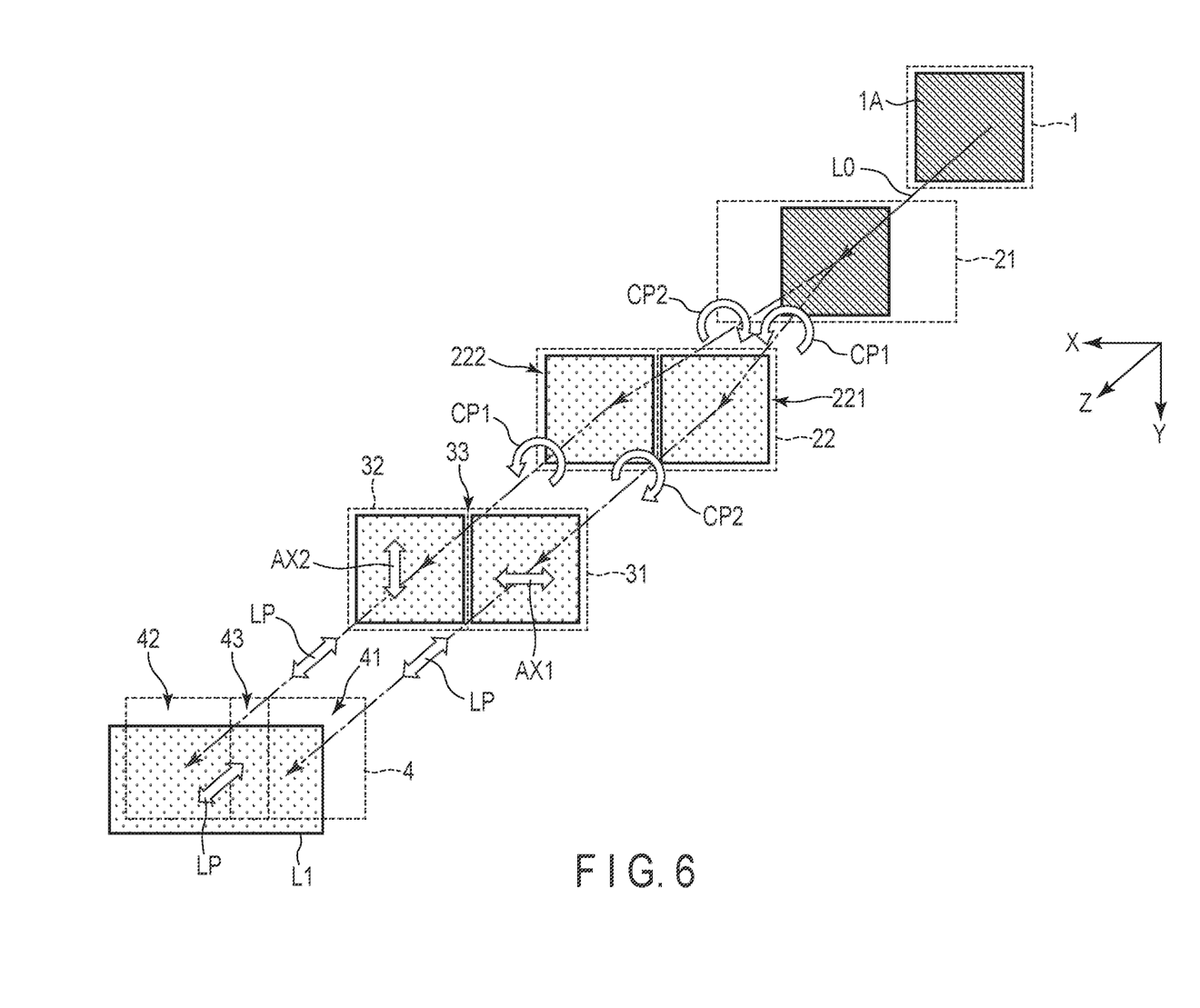
FIG. 6 is a diagram for explaining an optical action of the illumination device IL.

FIG. 6 is a diagram for explaining an optical action of the illumination device IL.

The second liquid crystal element 22 has a first region 221 and a second region 222 arranged in the first direction X. Incidentally, the first region 221 and the second region 222 are not clearly distinguishable regions in the second liquid crystal element 22. For convenience, a right-half region and a left-half region of the second liquid crystal element 22 illustrated in FIG. 6 will be described as the first region 221 and the second region 222, respectively.

The first phase difference layer 31 is opposed to the first region 221 and has the first optical axis AX1 parallel to the first direction X. The second phase difference layer 32 is opposed to the second region 222 and has the second optical axis AX2 parallel to the second direction Y.

The light emitting region 1A emits the illumination light L0 toward the first liquid crystal element 21. The first liquid crystal element 21 divides the illumination light L0, which is incident light, into the first circularly polarized light CP1 and the second circularly polarized light CP2, and also diffracts the first circularly polarized light CP1 and the second circularly polarized light CP2 toward the first region 221 and the second region 222, respectively. In the drawing, an optical path through which the first circularly polarized light CP1 transmitted through the first liquid crystal element 21 reaches the diffusion layer 4 is indicated by a one-dot chain line, and an optical path through which the second circularly polarized light CP2 transmitted through the first liquid crystal element 21 reaches the diffusion layer 4 is indicated by a two-dot chain line.

The first region 221 converts the first circularly polarized light CP1 as incident light into the second circularly polarized light CP2 and diffracts the converted second circularly polarized light CP2 toward the first phase difference layer 31. The second region 222 converts the second circularly polarized light CP2 as incident light into the first circularly polarized light CP1 and diffracts the converted first circularly polarized light CP1 toward the second phase difference layer 32.

The first phase difference layer 31 converts the second circularly polarized light CP2 as incident light into linearly polarized light LP. The second phase difference layer 32 converts the first circularly polarized light CP1 as incident light into linearly polarized light LP. Since the first optical axis AX1 of the first phase difference layer 31 acting on the second circularly polarized light CP2 and the second optical axis AX2 of the second phase difference layer 32 acting on the first circularly polarized light CP1 are orthogonal to each other, the polarization direction of the linearly polarized light LP that is transmitted light through the first phase difference layer 31 is substantially parallel to the polarization direction of the linearly polarized light LP that is transmitted light through the second phase difference layer 32.

In the diffusion layer 4, the first diffusion region 41 transmits the linearly polarized light LP as the transmitted light through the first phase difference layer 31, and further appropriately diffuses the linearly polarized light LP. In addition, the second diffusion region 42 transmits the linearly polarized light LP as the transmitted light through the second phase difference layer 32, and further appropriately diffuses the linearly polarized light LP. Further, the third diffusion region 43 diffuses the light (in addition to the desired linearly polarized light LP, undesired linearly polarized light may be included) transmitted through the vicinity of the boundary 33.

As a result, illumination light L1 having a uniform polarization direction can be generated. In addition, the area of the illumination region on an object illuminated by the illumination light L1 is about twice the area of the light emitting region 1A (the length of the illumination region along the first direction X is substantially twice the length of the light emitting region 1A, and the length of the illumination region along the second direction Y is substantially once the length of the light emitting region 1A).

The object herein is, for example, the liquid crystal panel PNL illustrated in FIG. 2. Since the illumination light L1 is linearly polarized light having a uniform polarization direction, the polarizer between the liquid crystal panel PNL and the illumination device IL can be omitted as described with reference to FIG. 2. Moreover, since the liquid crystal panel PNL is illuminated with linearly polarized light having a uniform polarization direction, non-uniformity in luminance of an image displayed on the liquid crystal panel PNL is suppressed.

Next, another embodiment will be described.

Second Embodiment

Figure 7:
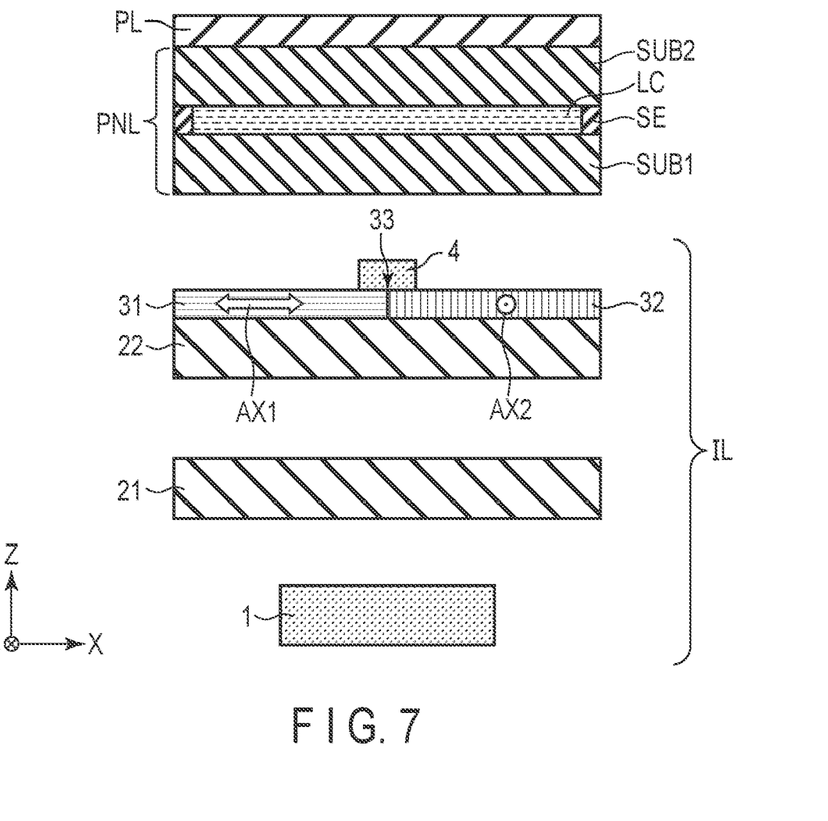
FIG. 7 is a diagram illustrating a second embodiment of the illumination device IL illustrated in FIG. 1.

FIG. 7 is a diagram illustrating a second embodiment of the illumination device IL illustrated in FIG. 1. The second embodiment illustrated in FIG. 7 is different from the first embodiment illustrated in FIG. 2 in that a diffusion layer 4 is disposed along a boundary 33 between a first phase difference layer 31 and a second phase difference layer 32. The diffusion layer 4 is disposed so as to be opposed to a region in the vicinity of the boundary 33 in the first phase difference layer 31 and a region in the vicinity of the boundary 33 in the second phase difference layer 32. The diffusion layer 4 is not opposed to the other region of the first phase difference layer 31 and the other region of the second phase difference layer 32, and a first substrate SUB1 of a liquid crystal panel PNL is opposed to these other regions via an air layer.

Figure 8:
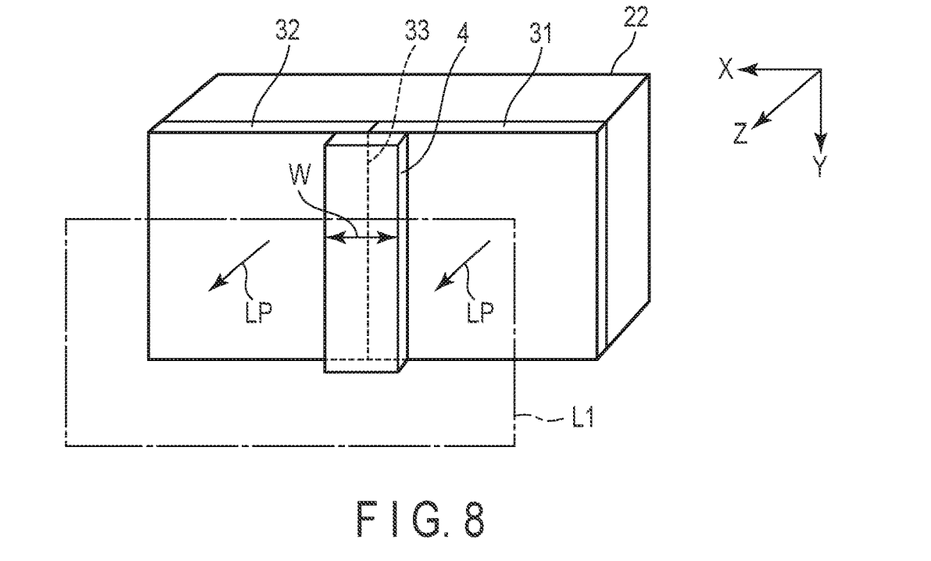
FIG. 8 is a diagram illustrating a diffusion layer 4 illustrated in FIG. 7.

FIG. 8 is a diagram illustrating the diffusion layer 4 illustrated in FIG. 7. The diffusion layer 4 is formed in a strip shape along the boundary 33. The boundary 33 is formed along the second direction Y. For this reason, the diffusion layer 4 extends along the second direction Y. The diffusion layer 4 has a width W along the first direction X of, for example, about 200 µm. In each of the first phase difference layer 31 and the second phase difference layer 32, an area of a region not opposed to the diffusion layer 4 is larger than an area of a region opposed to the diffusion layer 4.

The diffusion layer 4 diffuses light (in addition to desired linearly polarized light LP, undesired linearly polarized light may be included) transmitted through the vicinity of the boundary 33. In contrast, the linearly polarized light LP that has been transmitted through the first phase difference layer 31 and the second phase difference layer 32 without being transmitted through the diffusion layer 4 is hardly diffused, and maintains its parallelism.

Even in the second embodiment, the same effect as in the above-mentioned first embodiment can be obtained. Moreover, in the second embodiment, the area of the region not opposed to the diffusion layer 4 in each of the first phase difference layer 31 and the second phase difference layer 32 is enlarged as compared with the first embodiment. For this reason, illumination light L1 having high parallelism and a uniform polarization direction can be generated.

Third Embodiment

Figure 9:
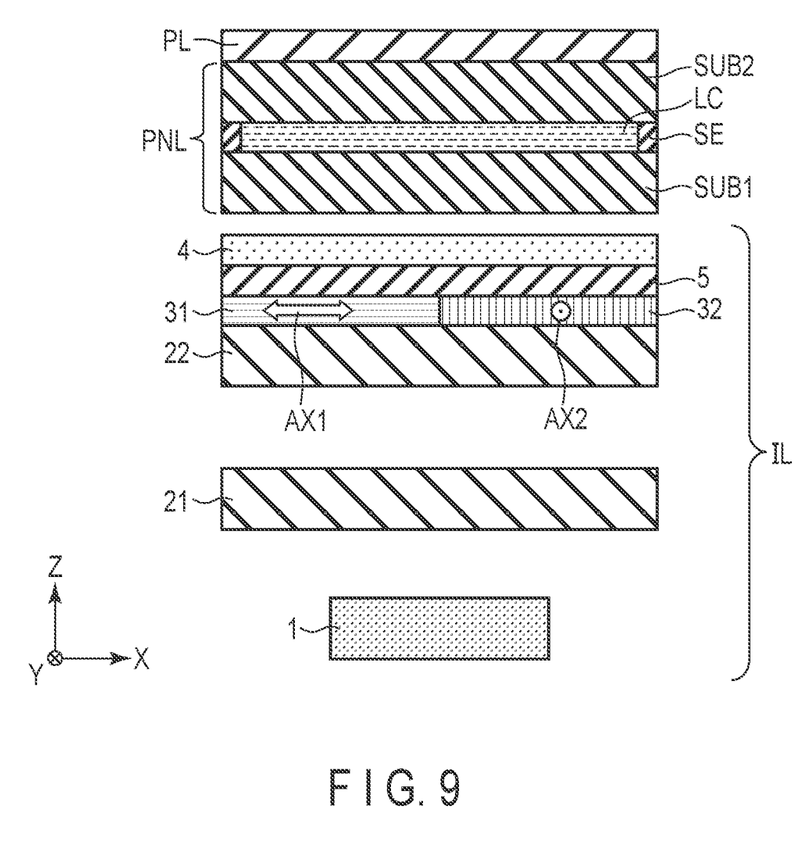
FIG. 9 is a diagram illustrating a third embodiment of the illumination device IL illustrated in FIG. 1.

FIG. 9 is a diagram illustrating a third embodiment of the illumination device IL illustrated in FIG. 1. The third embodiment illustrated in FIG. 9 is different from the first embodiment illustrated in FIG. 2 in that a prism sheet 5 is disposed between a first phase difference layer 31 and a diffusion layer 4 and between a second phase difference layer 32 and the diffusion layer 4. Although the diffusion layer 4 is configured to have a uniform haze over the entire surface, the diffusion layer 4 may be configured to have different hazes depending on the region as in the first embodiment, or may be provided only in a region opposed to a boundary 33 as in the second embodiment.

Figure 10:
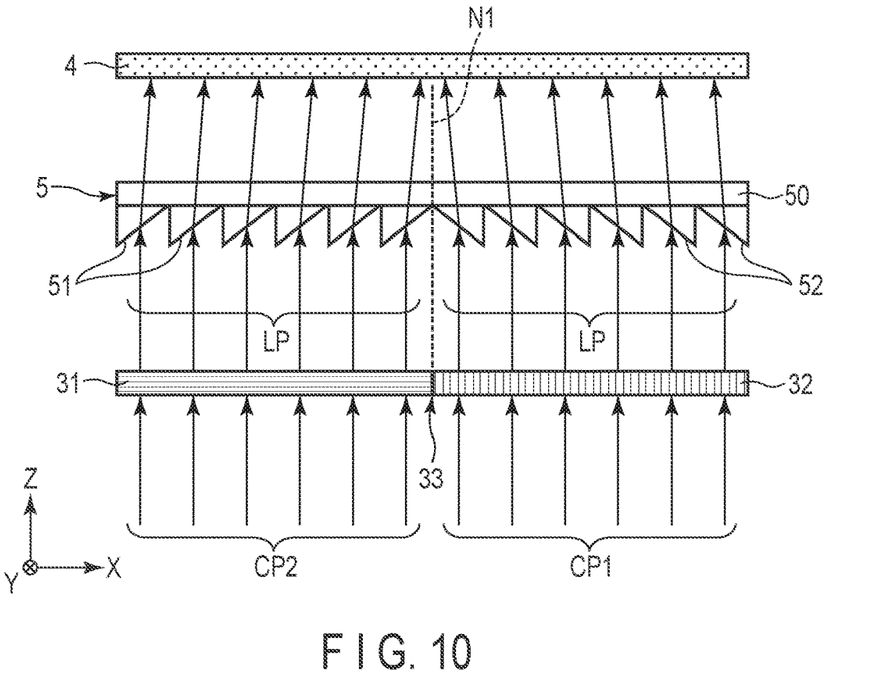
FIG. 10 is a diagram illustrating an example of a prism sheet 5 illustrated in FIG. 9.

FIG. 10 is a diagram illustrating an example of the prism sheet 5 illustrated in FIG. 9. The prism sheet 5 includes a base 50, a plurality of first prisms 51 arranged in the first direction X, and a plurality of second prisms 52 arranged in the first direction X. The first prisms 51 are located between the first phase difference layer 31 and the diffusion layer 4. The second prisms 52 are located between the second phase difference layer 32 and the diffusion layer 4. Incidentally, the first prisms 51 and the second prisms 52 are provided on a side of the base 50 opposed to the first phase difference layer 31 and a side of the base 50 opposed to the second phase difference layer 32, respectively, but may be provided on a side of the base 50 opposed to the diffusion layer 4.

Each of the first prism 51 and the second prism 52 extends along the second direction Y and has a triangular cross section in the X-Z plane. The cross-sectional shape of the first prism 51 is symmetrical with the cross-sectional shape of the second prism 52. In the example illustrated in FIG. 10, the first prisms 51 and the second prisms 52 are line-symmetric with respect to a normal N1 that passes through the boundary 33 and is perpendicular to the base 50.

Second circularly polarized light CP2 that is substantially parallel light is converted into linearly polarized light LP in the first phase difference layer 31, and is then refracted toward a side close to the normal N1 in the first prism 51. Similarly, first circularly polarized light CP1 that is substantially parallel light is converted into the linearly polarized light LP in the second phase difference layer 32 and is then refracted toward the side close to the normal N1 in the second prism 52. As a result, the linearly polarized light LP transmitted through the prism sheet 5 is condensed on the central portion of the diffusion layer 4.

As described above, light transmitted through the vicinity of the boundary 33 may include undesired linearly polarized light in addition to desired linearly polarized light LP. For this reason, with respect to light that has reached the central portion of the diffusion layer 4, the proportion of the undesired linearly polarized light may be higher than that of light that has reached other regions of the diffusion layer 4. The undesired linearly polarized light does not contribute to display even when reaching a liquid crystal panel PNL, and thus may cause non-uniformity in luminance.

According to the third embodiment, since the desired linearly polarized light LP is condensed on the central portion of the diffusion layer 4, the proportion of the undesired linearly polarized light is decreased. For this reason, as in the first embodiment, illumination light L1 having a uniform polarization direction can be generated. Moreover, since the liquid crystal panel PNL is illuminated with linearly polarized light having a uniform polarization direction, non-uniformity in luminance of an image displayed on the liquid crystal panel PNL is suppressed.

Incidentally, in the third embodiment, the example in which the prism sheet 5 is applied has been described, but another optical element that exerts the same function as the prism sheet 5 may be applied.

Modified Examples

Figure 11:
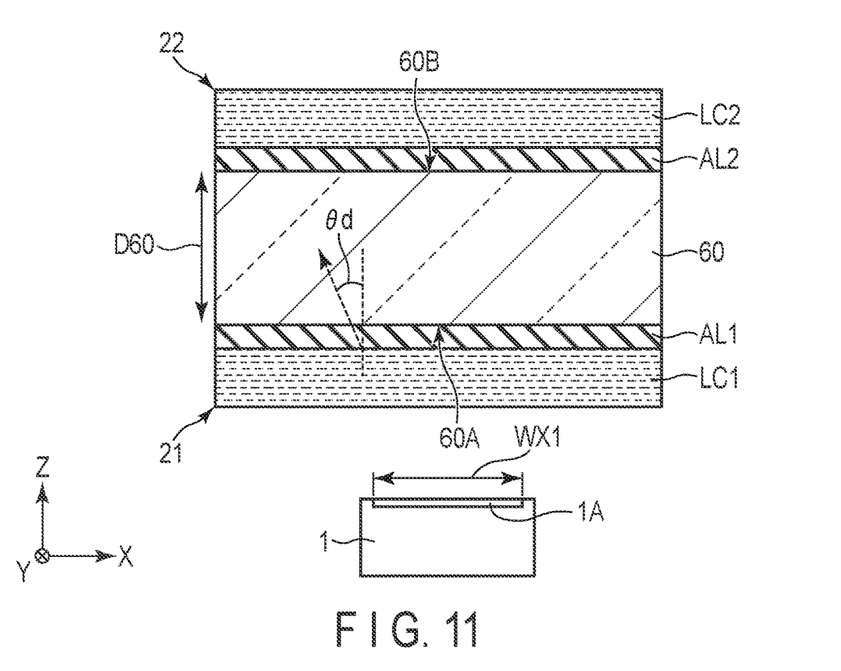
FIG. 11 is a diagram for explaining a modified example.

FIG. 11 is a diagram for explaining a modified example. The modified examples described here can be applied to any of the first embodiment, the second embodiment, and the third embodiment described above.

A transparent base 60 has a first surface 60A and a second surface 60B opposite to the first surface 60A. A first liquid crystal element 21 is disposed on the first surface 60A, and a second liquid crystal element 22 is disposed on the second surface 60B. A thickness D60 of the base 60 in third direction Z is set so as to form a necessary gap between the first liquid crystal element 21 and the second liquid crystal element 22.

The necessary gap between the first liquid crystal element 21 and the second liquid crystal element 22 is set such that first circularly polarized light CP1 and second circularly polarized light CP2 divided by the first liquid crystal element 21 reach the second liquid crystal element 22 without overlapping each other. For this reason, the gap can be defined by a width WX1 along the first direction X of a light emitting region 1A in the light source 1 and a diffraction angle θd in the first liquid crystal element 21. For example, when the width WX1 is 25 mm and the diffraction angle θd is 10°, the gap is about 35 mm. In other words, the thickness D60 of the base 60 is set to about 35 mm.

In the example illustrated in FIG. 11, an alignment film AL1 constituting the first liquid crystal element 21 is formed directly on the first surface 60A, and a liquid crystal layer LC1 overlaps the alignment film AL1. An alignment film AL2 constituting the second liquid crystal element 22 is formed directly on the second surface 60B, and a liquid crystal layer LC2 overlaps the alignment film AL2. This allows the first liquid crystal element 21 and the second liquid crystal element 22 to be integrated, and also allows the base 60 to be shared. For this reason, the number of members constituting an illumination device IL is reduced, and assembly work of the illumination device IL can be simplified.

<<Dimensional Relationship>>

Figure 12:
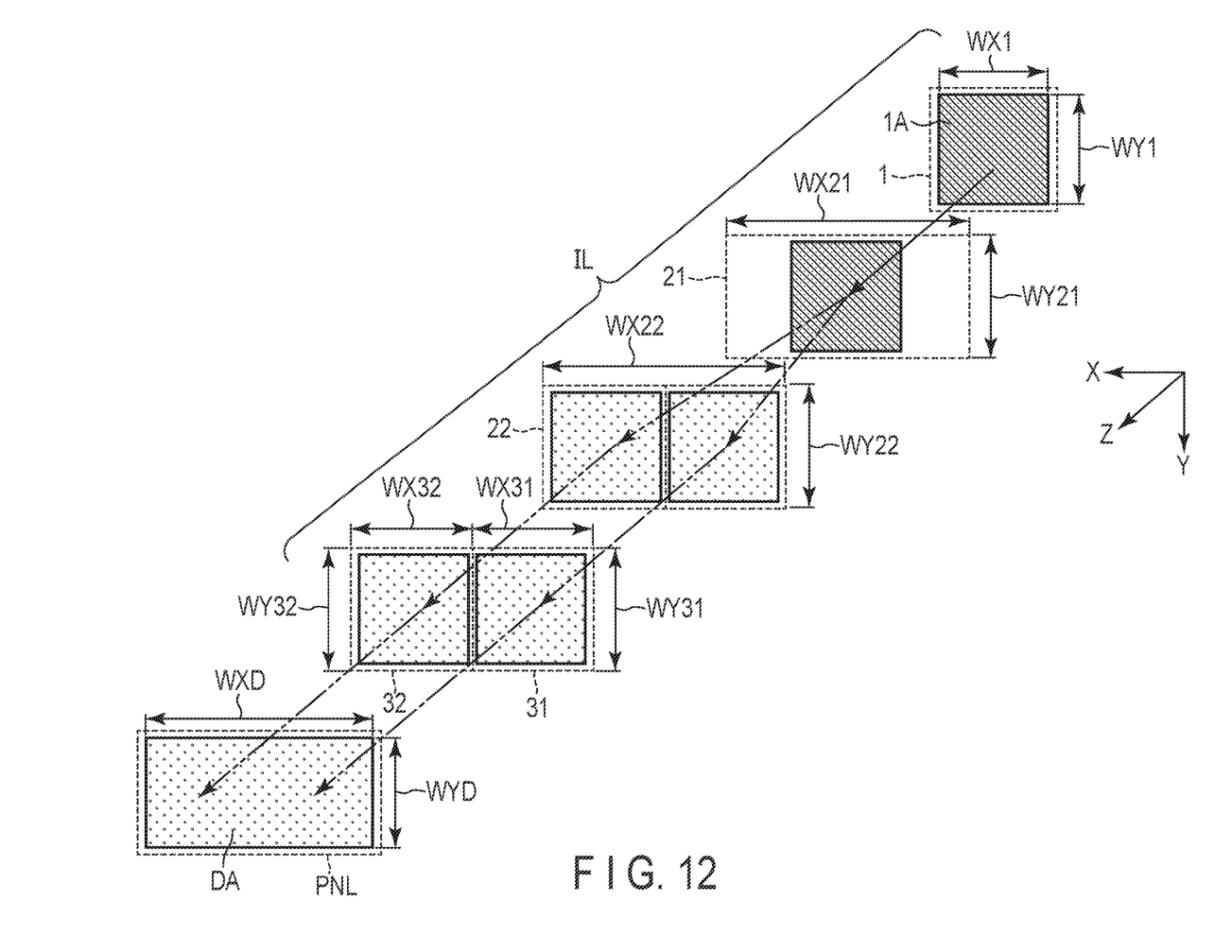
FIG. 12 is a diagram for explaining a dimensional relationship of each member constituting the illumination device IL.

FIG. 12 is a diagram for explaining a dimensional relationship of each member constituting the illumination device IL. The light emitting region 1A of the light source 1 has a width WX1 along the first direction X and a width WY1 along the second direction Y. The first liquid crystal element 21 has a width WX21 along the first direction X and a width WY21 along the second direction Y. The width WX21 is once or more the width WX1. The width WY21 is once or more the width WY1. In other words, the area of the first liquid crystal element 21 is once or more the area of the light emitting region 1A.

The second liquid crystal element 22 has a width WX22 along the first direction X and a width WY22 along the second direction Y. In an example in which the first circularly polarized light CP1 and the second circularly polarized light CP2 transmitted through the first liquid crystal element 21 are divided in the first direction X, the width WX22 is twice or more the width WX1. The width WY22 is once or more the width WY1. In other words, the area of the second liquid crystal element 22 is twice or more the area of the light emitting region 1A. In addition, the area of the second liquid crystal element 22 may be twice or more the area of the first liquid crystal element 21.

The first phase difference layer 31 has a width WX31 along the first direction X and a width WY31 along the second direction Y. The width WX31 is once or more the width WX1. The width WY31 is once or more the width WY1. In other words, the area of the first phase difference layer 31 is once or more the area of the light emitting region 1A.

The second phase difference layer 32 has a width WX32 along the first direction X and a width WY32 along the second direction Y. The width WX32 is once or more the width WX1. The width WY32 is once or more the width WY1. In other words, the area of the second phase difference layer 32 is once or more the area of the light emitting region 1A.

Incidentally, the width WX31 is equal to the width WX32, and the width WY31 is equal to the width WY32. In addition, the sum of the width WX31 and the width WX32 is equal to the width WX22.

A display region DA of a liquid crystal panel PNL has a width WXD along the first direction X and a width WYD along the second direction Y. The width WXD is twice or more the width WX1. The width WYD is once or more the width WY1. Incidentally, the width WXD is equal to the sum of the width WX31 and the width WX32.

As described above, according to the present embodiment, it is possible to provide an illumination device capable of generating illumination light having a uniform polarization direction.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An illumination device comprising:
a light source having a light emitting region;
a first liquid crystal element opposed to the light emitting region;
a second liquid crystal element comprising a first main surface opposed to the first liquid crystal element and a second main surface opposite to the first main surface;
a first phase difference layer disposed on the second main surface and having a first optical axis in plane;
a second phase difference layer disposed on the second main surface, adjacent to the first phase difference layer, and having a second optical axis orthogonal to the first optical axis in plane; and a diffusion layer opposed to the first phase difference layer and the second phase difference layer, wherein each of the first liquid crystal element and the second liquid crystal element has a plurality of liquid crystal molecules, and is cured in a state in which an alignment direction of the liquid crystal molecules has continuously changed in plane.

2. The illumination device according to claim 1, wherein the diffusion layer comprises:

a first diffusion region opposed to the first phase difference layer;

a second diffusion region opposed to the second phase difference layer; and a third diffusion region located between the first diffusion region and the second diffusion region, and opposed to a region including a boundary between the first phase difference layer and the second phase difference layer, and the third diffusion region has a haze higher than each of a haze of the first diffusion region and a haze of the second diffusion region.

3. The illumination device according to claim 1, wherein the diffusion layer is formed in a strip shape extended along the boundary between the first phase difference layer and the second phase difference layer.

4. The illumination device according to claim 1, further comprising a prism sheet comprising a first prism located between the first phase difference layer and the diffusion layer; and a second prism located between the second phase difference layer and the diffusion layer, wherein a cross-sectional shape of the first prism is symmetrical with a cross-sectional shape of the second prism with respect to a normal of the prism sheet.

5. The illumination device according to claim 1, further comprising a transparent base having a first surface and a second surface opposite to the first surface, wherein the first liquid crystal element is disposed on the first surface, and the second liquid crystal element is disposed on the second surface.

6. The illumination device according to claim 1, wherein the first phase difference layer and the second phase difference layer are arranged in a first direction, and the first liquid crystal element has a width along the first direction that is once or more a width of the light emitting region along the first direction.

7. The illumination device according to claim 6, wherein the second liquid crystal element has a width along the first direction that is twice or more the width of the light emitting region along the first direction.

8. The illumination device according to claim 6, wherein the first phase difference layer and the second phase difference layer have the same width along the first direction that is once or more the width of the light emitting region along the first direction.

9. The illumination device according to claim 6, wherein each of the first liquid crystal element, the second liquid crystal element, the first phase difference layer, and the second phase difference layer has a width along a second direction orthogonal to the first direction that is once or more a width of the light emitting region along the second direction.

10. An illumination device comprising:

a light source;

a first liquid crystal element opposed to the light source;

a second liquid crystal element opposed to the first liquid crystal element and having a first region and a second region;

a first phase difference layer opposed to the second liquid crystal element; and a second phase difference layer opposed to the second liquid crystal element and adjacent to the first phase difference layer, wherein the first liquid crystal element diffracts first circularly polarized light out of emitted light from the light source toward the first region, and diffracts second circularly polarized light rotating reversely to the first circularly polarized light toward the second region, in the first region, the second liquid crystal element converts first circularly polarized light into second circularly polarized light and diffracts the second circularly polarized light toward the first phase difference layer, and in the second region, the second liquid crystal element converts second circularly polarized light into first circularly polarized light and diffracts the first circularly polarized light toward the second phase difference layer, the first phase difference layer converts second circularly polarized light into linearly polarized light, the second phase difference layer converts first circularly polarized light into linearly polarized light, and a polarization direction of linearly polarized light that is transmitted light through the first phase difference layer is substantially parallel to a polarization direction of linearly polarized light that is transmitted light through the second phase difference layer.

11. The illumination device according to claim 10, further comprising a diffusion layer opposed to the first phase difference layer and the second phase difference layer, wherein the diffusion layer comprises:

a first diffusion region opposed to the first phase difference layer;

a second diffusion region opposed to the second phase difference layer; and a third diffusion region located between the first diffusion region and the second diffusion region, and opposed to a region including a boundary between the first phase difference layer and the second phase difference layer, and the third diffusion region has a haze higher than each of a haze of the first diffusion region and a haze of the second diffusion region.

12. The illumination device according to claim 11, wherein the diffusion layer is formed in a strip shape extended along the boundary between the first phase difference layer and the second phase difference layer.

13. The illumination device according to claim 11, further comprising a prism sheet comprising a first prism located between the first phase difference layer and the diffusion layer; and a second prism located between the second phase difference layer and the diffusion layer, wherein a cross-sectional shape of the first prism is symmetrical with a cross-sectional shape of the second prism with respect to a normal of the prism sheet.

14. The illumination device according to claim 10, further comprising a transparent base having a first surface and a second surface opposite to the first surface, wherein the first liquid crystal element is disposed on the first surface, and the second liquid crystal element is disposed on the second surface.

15. The illumination device according to claim 10, wherein the first phase difference layer and the second phase difference layer are arranged in a first direction, and the first phase difference layer and the second phase difference layer have the same width along the first direction.

* * * * *